Oct. 16, 1934.  W. E. HARDING  1,976,783
LIQUID LEVEL INDICATOR
Filed May 10, 1932  2 Sheets-Sheet 1

William E. Harding INVENTOR.

BY

W. E. Currie ATTORNEYS.

Oct. 16, 1934.    W. E. HARDING    1,976,783
LIQUID LEVEL INDICATOR
Filed May 10, 1932    2 Sheets-Sheet 2

INVENTOR.
William E. Harding
BY
W. E. Currie  ATTORNEYS.

Patented Oct. 16, 1934

1,976,783

UNITED STATES PATENT OFFICE 1,976,783

LIQUID LEVEL INDICATOR

William E. Harding, North Plainfield, N. J., assignor to Standard Oil Development Company, a corporation of Delaware Application May 10, 1932, Serial No. 610,511

8 Claims. (Cl. 116—118)

This invention relates to improvements in devices for indicating the level of a column of liquid.

The invention will be fully understood from the following description taken in connection with the accompanying drawings in which latter—

Figure 2:
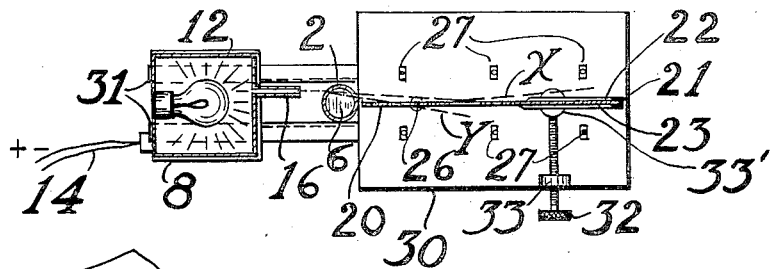
Fig. 2 is a transverse sectional view taken along the line II—II of Fig. 1.
Figure 1:
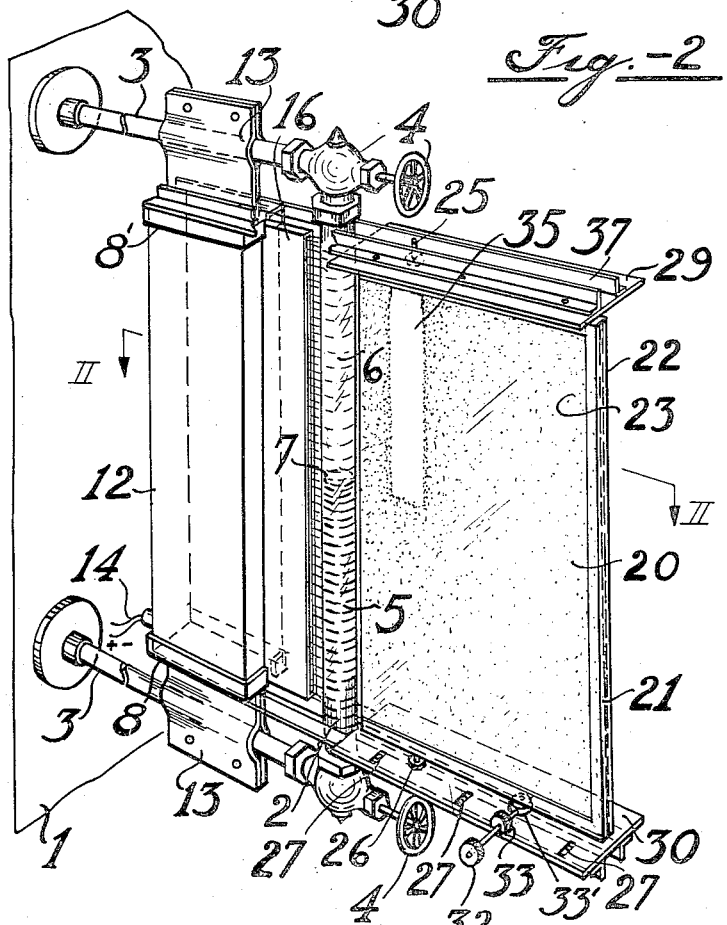
Fig. 1 is a perspective view of the device.
Figure 3:
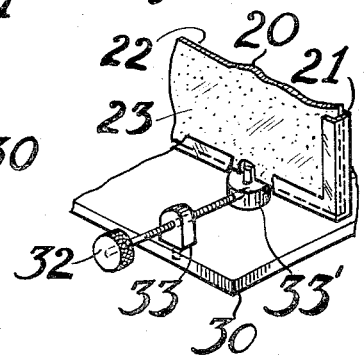
Fig. 3 is a detailed view of the means for effecting angular adjustment of the screen.

Referring to the drawings, reference numeral 1 designates a container adapted to hold non-miscible liquids of different specific gravities and different indices of refraction. A gauge glass is associated with the container and comprises a cylindrical tube 2 of substantially transparent material such as glass. The tube 2 is disposed in substantially vertical position and communicates at its opposite ends with pipes 3 which open into the interior of the container 1. Suitable valves 4 in the pipes 3 control communication of the tube 2 with the pipes. The gauge glass is so positioned with respect to the container 1 that both the relatively heavy liquid designated 5 and the relatively light liquid designated 6 are disposed in the gauge glass. In the embodiment illustrated the relatively heavy liquid is water and the relatively light liquid is gasoline. The dividing line between the two liquids is designated as 7.

A lamp or lantern is provided for directing a layer of light in a substantially vertical plane through the column of liquid. The lamp or lantern comprises a housing 12 which rests between supports 8' and 8' supported between pipes 3 by means of clamps 13. The lamp contains a plurality of electric light bulbs, which are operated through the conduits of electricity 14. Other illuminating means can be used if desired. The housing 12 of the lamp or lantern is provided with a substantially vertically extending slot 16 which is adapted to direct the light rays from the lamp in a substantially vertically extending layer through the column of non-miscible liquids of different specific gravities and different indices of refraction.

The rays of light in passing through the column of liquid are diverted varying amounts depending upon the index of the refraction of the particular liquid through which the rays pass and against a screen. The screen comprises a plate of glass 20 or other transparent material which is mounted in a suitable frame 21. The frame 21 does not extend along the edge of the glass adjoining the column of liquid. The plate of glass is provided with a polished side 22 and a frosted side 23. The screen is pivotally supported by pivot pins 25 and 26 which extend from the frame 21 through holes 27, in supporting plates 29 and 30 respectively. A plurality of slotted holes 27 are provided in plates 29 and 30 to permit of adjusting of the pivotal support for the screen. The plates 29 and 30 are supported by bracket arms 31 which in turn are secured to the clamps 13. The pivotal position of the screen is controlled by a thumb screw 32 which has adjustable engagement with a pivoted thrust block 33 on plate 30 and which engages the frame 21 of the screen thru a topped pivoted thrust block 33'. The angular position of the screen is so adjusted that all of the rays of light will be directed against the polished surface of the screen at such an angle that the rays passing through the water and marked X fall at such an angle to the screen that they will be totally reflected from the screen. The rays of light passing through the gasoline and marked Y strike the polished side of the screen at such an angle that they are refracted through the screen and illuminate the frosted surface of the glass as clearly indicated at 35.

Figure 6:
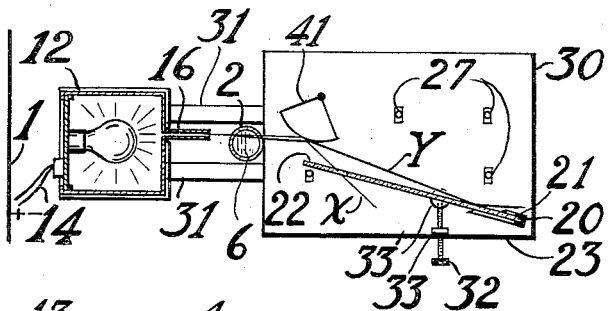
Fig. 6 is a transverse sectional view taken along the line VI—VI of Fig. 4.
Figures 4, 5, 7:
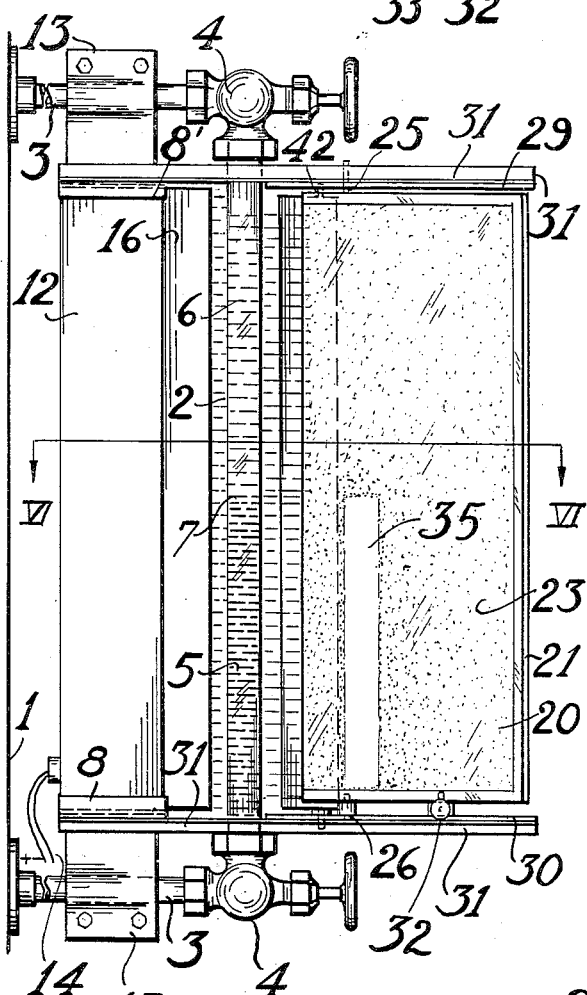
Fig. 4 is a side elevational view of a modified form of the device.
Fig. 5 is an end view of the device shown in Fig. 4.
Fig. 7 is a perspective view with parts broken away of the cylindrical mirror.

Referring to Figs. 4 to 7 inclusive a modified form of the invention is shown which includes a cylindrical mirror placed in the path of the rays of light intermediate the column of liquid and the screen. The cylindrical mirror is associated with a lamp or lantern and screen of identical construction with that previously described and like reference numerals are used to designate like parts.

The cylindrical mirror comprises a framework consisting of metal plates 40 which are secured to a chromium plated member 41 formed in the segment of a cylinder. The chromium plated body constitutes the mirror or reflecting surface. The framework is provided with pivot pins 42 which extend through suitable openings 25 and 26 in the plates 29 and 30. The cylindrical mirror functions to increase the angle between the beams of light X and Y issuing through the column of liquids. The angular position of the screen is so adjusted as to receive both of the rays X and Y upon its polished surface, the rays X which have passed thru the water being refracted thru the screen to illuminate the frosted surface of the glass and the rays Y which have passed thru the gasoline being totally reflected from the polished surface of the screen.

By the construction described a clear indication is obtained of the horizontal plane between the two non-miscible liquids of different specific gravity and different indices of refraction. The difference in the refractive index of two liquids is used to indicate the level of the plane between the liquids.

While the invention has been described as applied to a column of liquid comprising gasoline and water, it will be understood that it can be applied also to other liquids which will permit of the passage of light therethru and which are non-miscible, of different specific gravity and which have a different index of refraction. It is contemplated to so arrange the screen that either the heavier or the lighter liquid will produce the illuminated band upon the screen. It is contemplated to use light rays outside of the visible range when opaque liquids constitute the column of liquid.

Various changes may be made within the scope of the appended claims in which it is desired to claim all novelty inherent in the invention as broadly as the prior art permits.

I claim:

1. A liquid level indicator for a transparent container having a column of non-miscible liquids of different specific gravities and different indices of refraction, comprising a screen of transparent material associated with the column, one surface of the screen being frosted and the opposite surface being polished, a lamp having an elongated opening and associated with the column for directing a substantially vertical plane of light through the column against the polished surface of the screen at such an angle that the light rays passing through one liquid only are deflected by the polished surface through the screen to illuminate the frosted surface of the screen.

2. A liquid level indicator for a transparent container having a column of non-miscible liquids of different specific gravities and different indices of refraction, according to claim 1, in which means are provided for pivoting the screen by its vertical axis.

3. A liquid level indicator for a transparent container having a column of non-miscible liquids of different specific gravities and different indices of refraction, according to claim 1, in which means are provided for increasing the horizontal angle between the refracted light beams passing through the different liquids, and for directing the thus treated light rays against the screen.

4. A liquid level indicator for a transparent container having a column of non-miscible liquids of different specific gravities and different indices of refraction, according to claim 1, in which a cylindrical mirror is positioned to increase the horizontal angle between the light rays passed through the container and directing the thus treated rays against the screen.

5. In combination, a tube for fluids with different critical refraction angles, an illuminant at the side of the tube, means for directing a substantially vertical plane of light from the illuminant through a portion only of the cross section of the tube, whereby the light rays passing through one fluid are refracted as a group at one angle and the rays passing through the other fluid are refracted as a group at a different angle, and means disposed in the path of the refracted rays and affording passage solely to one of the groups of rays.

6. In combination, a tube for fluids with different critical refraction angles, an illuminant at the side of the tube, means for directing a substantially vertical plane of light from the illuminant through a portion only of the cross section of the tube, whereby the light rays passing through one fluid are reflected as a group at one angle and the rays passing through the other fluid are refracted as a group at a different angle, and means disposed in the path of the refracted rays reflecting one group of rays and refracting the other group of rays.

7. In combination, a tube for fluids with different critical refraction angles, an illuminant at the side of the tube, means for directing a substantially vertical plane of light from the illuminant through a portion only of the cross section of the tube, whereby the light rays passing through one fluid are refracted as a group at one angle and the rays passing through the other fluid are refracted as a group at a different angle, and a screen disposed in the path of the refracted rays reflecting one group of rays and refracting the other group of rays, the screen having a diffusing surface for diffusing the rays refracted through the screen.

8. The method of indicating the level of the liquid column in gauge glasses and the like, comprising projecting a substantially vertical plane of light through a portion only of the glass and contents, whereby the light rays passing through the fluid above the liquid column are refracted as a group at one angle and the rays passing through the liquid are refracted as a group at a different angle, reflecting one group of the refracted rays from a screen, refracting the other group through the screen, and diffusing the last mentioned refracted rays.

WILLIAM E. HARDING.